US007867022B2

(12) United States Patent  (10) Patent No.: US 7,867,022 B2
Davison et al.  (45) Date of Patent: Jan. 11, 2011

(54) BRACKETS AND RECEPTACLE ASSEMBLIES WITH ANGLED PORTS

(75) Inventors: Andrew C. Davison, Harrisburg, PA (US); Steven Lee Flickinger, Hummelstown, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 12/420,159

(22) Filed: Apr. 8, 2009

(65) Prior Publication Data

US 2010/0261378 A1 Oct. 14, 2010

(51) Int. Cl.
*H01R 13/60* (2006.01)
*H01R 13/66* (2006.01)

(52) U.S. Cl. .............................. 439/540.1; 439/607.55
(58) Field of Classification Search .............. 439/540.1, 439/719, 532, 534; 385/53, 55, 135
See application file for complete search history.

(56) References Cited

U.S. PATENT DOCUMENTS

| 6,537,106 | B1 | 3/2003 | Follingstad ................. 439/534 |
| 6,568,861 | B2 * | 5/2003 | Benner et al. ................. 385/55 |
| 6,607,303 | B2 * | 8/2003 | Ngo et al. ...................... 385/53 |
| 6,840,681 | B2 * | 1/2005 | Shibutani et al. .............. 385/53 |
| 6,863,446 | B2 * | 3/2005 | Ngo ............................. 385/72 |
| 6,916,199 | B2 | 7/2005 | Follingstad ................. 439/534 |
| 7,029,182 | B2 * | 4/2006 | Ngo ............................. 385/53 |
| 7,094,095 | B1 | 8/2006 | Caveney .................. 439/540.1 |
| 7,343,078 | B2 | 3/2008 | Spisany et al. ............. 385/137 |
| 7,488,205 | B2 * | 2/2009 | Spisany et al. ........... 439/540.1 |

* cited by examiner

*Primary Examiner*—Hae Moon Hyeon (57) ABSTRACT

A bracket configured to be mounted to a support wall. The bracket includes a panel that has opposing first and second sides that extend along a plane. The first side faces an exterior space and the second side facing an interior space. The bracket also includes a hub that is configured to receive an electronic device. The hub includes a first hub portion that extends from the first side and a second hub portion that extends from the second side toward the interior space. The first and second hub portions define a port through the panel to connect the interior and exterior spaces. The port extends along a central axis and is sized and shaped to receive and receive the device along the central axis. The central axis forms a non-orthogonal angle with respect to the plane of the first and second sides.

20 Claims, 6 Drawing Sheets

BRACKETS AND RECEPTACLE ASSEMBLIES WITH ANGLED PORTS

BACKGROUND OF THE INVENTION

The subject matter herein relates generally to receptacle assemblies for receiving removable electronic modules, and more particularly, to receptacle assemblies configured to receive the modules inserted in a non-orthogonal direction.

Some electrical systems, such as server systems, router systems, or desktop computers, may include ports along a side or within the system that open to an exterior space of the electrical system. The ports may be configured to receive a removable electronic module. The electronic module may be, for example, a registered jack or a small-form factor pluggable (SFP) transceiver that is communicatively coupled to another system or device through a cable. For example, some SFP transceivers are communicatively coupled to the other electrical system through fiber optic cables.

However, electrical systems are frequently located within confined spaces. Furthermore, the ports for receiving electronic modules may be located in areas that are not easily accessible to a user. For example, a room may be used to house several servers or computers that are located side-by-side and proximate to each other. If the servers or computers have ports that face a wall of an enclosure door or a wall of another electrical system, then the cables extending from the electronic modules that are engaged with the ports may have to bend sharply. When fiber optic cables are bent the transmission through the fiber optic cable may be negatively affected (i.e., increased loss). Furthermore, cables having copper wiring may also be negatively affected if the cable is forced to bend sharply.

Accordingly, there is a need for a receptacle assembly having one or more ports that may receive an electronic module in a manner that may alleviate the bending strain of an attached cable. Furthermore, there is also a need for alternative configurations to receptacle assemblies having one or more ports.

BRIEF DESCRIPTION OF THE INVENTION

In one embodiment, a bracket configured to be mounted to a support wall is provided. The bracket includes a panel that has opposing first and second sides that extend along a plane. The first side faces an exterior space and the second side faces an interior space. The bracket also includes a hub that is configured to receive an electronic device. The hub includes a first hub portion that extends from tile first side into the exterior space and a second hub portion that extends from the second side into the interior space. The first and second hub portions define a port through the panel to connect the interior and exterior spaces. The port extends along a central axis and is sized and shaped to receive the device along the central axis. The central axis forms a non-orthogonal angle with respect to the plane of the first and second sides.

Optionally, the hub may be a plurality of hubs where each hub has a port that extends along a central axis. The central axes of the plurality of hubs may be oriented in a common direction with respect to each other. Also, the hub may include an inner surface that defines the port. The inner surface may extend along the central axis and be continuously smooth as the inner surface extends therealong. The port may also have a uniform cross-section therethrough that is perpendicular to the central axis.

In another embodiment, a receptacle assembly configured to be mounted to a support wall is provided. The Support wall separates interior and exterior spaces of an electrical system. The receptacle assembly includes a receptacle that has a guideframe configured to receive an electronic module and a bracket that is configured to be mounted to the support wall. The bracket includes a panel that has opposing first and second sides that extend along a plane. The first side faces an exterior space and the second side faces an interior space. The bracket also includes a hub that is configured to receive an electronic device. The hub includes a first hub portion that extends from the first side into the exterior space and a second hub portion that extends from the second side into the interior space. The first and second hub portions define a port through the panel to connect the interior and exterior spaces. The port extends along a central axis and is sized and shaped to receive the device along the central axis. The central axis forms a non-orthogonal angle with respect to the plane of the first and second sides.

Optionally, the receptacle assembly may also include a circuit board that is configured to be mechanically and electrically coupled to the receptacle. The circuit board may include an edge having a cut-out shaped to surround the second hub portion projecting from the panel. The cut-out may extend an edge distance away from the second side of the panel. The receptacle and the circuit board may engage each other at a coupling point located at a point distance away from the second side. The point distance may be less than the edge distance.

DETAILED DESCRIPTION OF THE INVENTION

Figure 1:
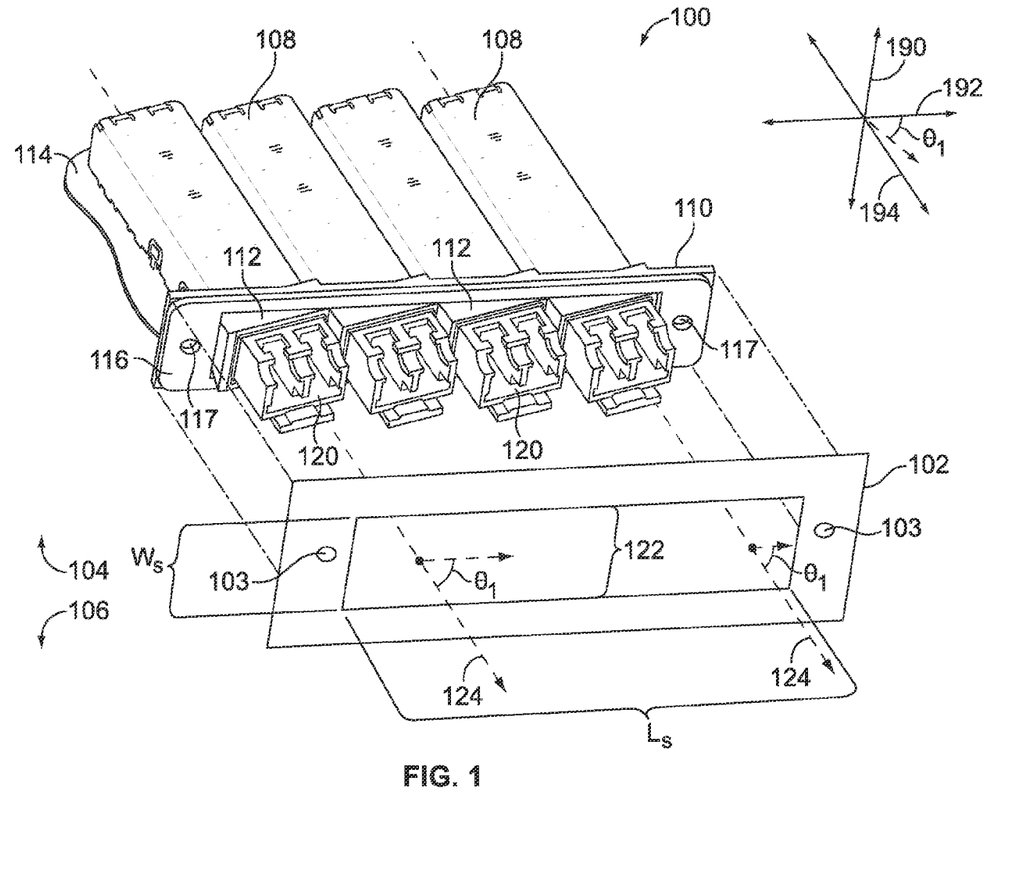
FIG. 1 is a perspective view of a receptacle assembly formed in accordance with one embodiment.
Figure 3:
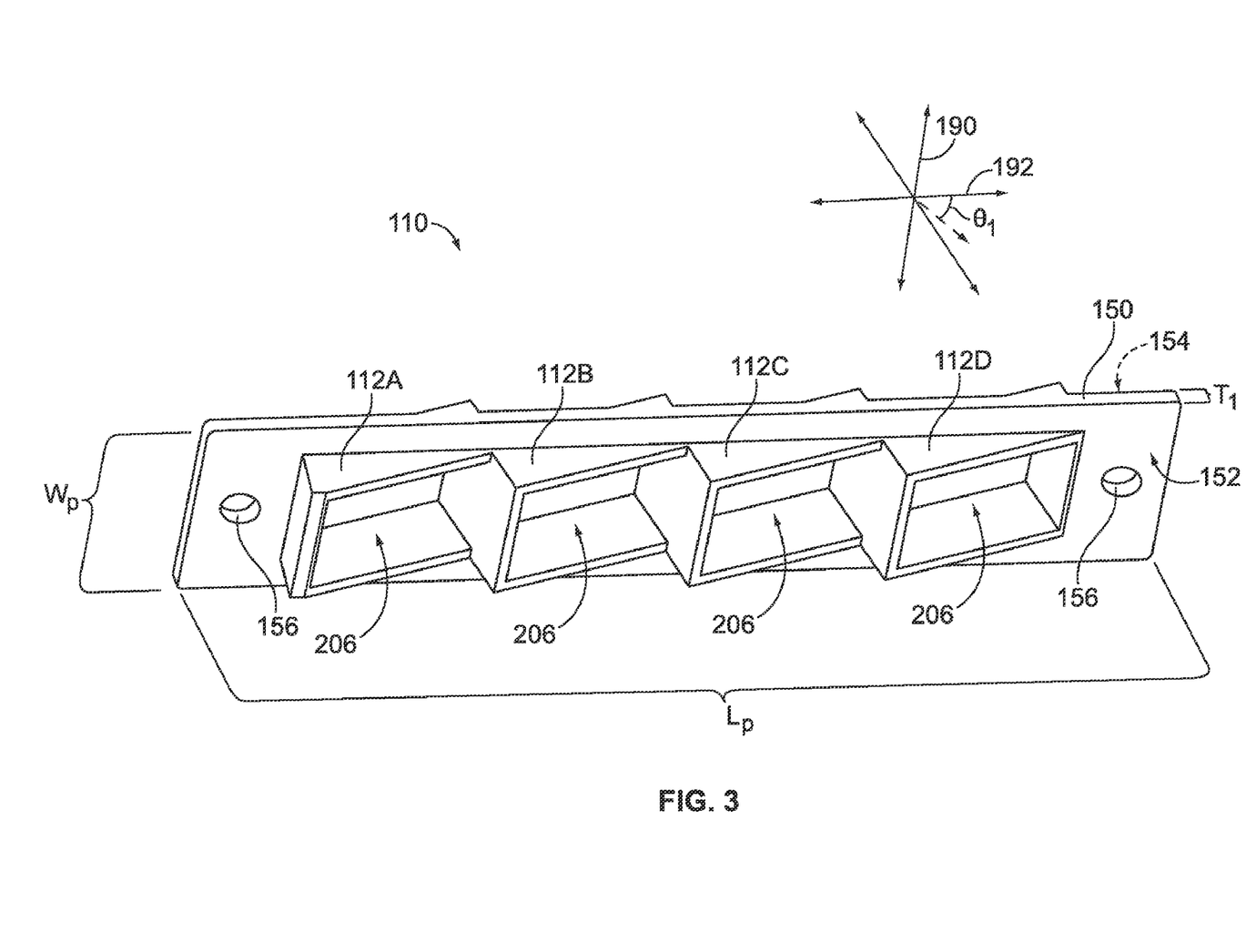
FIG. 3 is an isolated perspective view of a bracket formed in accordance with one embodiment that may be used with the receptacle assembly shown in FIG. 1.

FIG. 1 is a perspective view of a receptacle assembly 100 formed in accordance with one embodiment before the receptacle assembly 100 is mounted to a support wall 102 of an electrical system (not shown). The support wall 102 may be, for example, a wall or panel in a computer or server system. The support wall 102 may separate an interior space 104 and an exterior space 106 and includes a window 122 where the receptacle assembly 100 may be mounted thereto. The window 122 has a length $L_S$ and a width $W_S$. The receptacle assembly 100 includes one or more receptacles 108, a bracket 110 having one or more hubs 112 that are shaped to receive the receptacles 108, and a circuit board 114 that is configured to be mechanically and electrically coupled to the receptacles 108. The receptacle assembly 100 may also include a gasket 116 that extends between the bracket 110 and the support wall 102 when the receptacle assembly 100 is mounted to the support wall 102. The bracket 110 and the gasket 116 are configured to be mounted to the support wall 102 so that the hubs 112 may be accessed through the window 122. For example, when the receptacle assembly 100 is mounted to the support wall 102, the ports are configured to receive electronic modules 120 inserted through the window 122. The receptacle assembly 100 may be configured to shield the modules 120 against electromagnetic interference (EMI). Moreover, the bracket 110 may be electrically connected to the support wall 102 to maintain electromagnetic interference (EMI) integrity.

As shown, the receptacle assembly 100 and support wall 102 are oriented with respect to a vertical axis 190, a horizontal or lateral axis 192, and a longitudinal axis 194. Each receptacle 108 and corresponding module 120 may extend along a central axis 124. The hubs 112 of the bracket 110 are configured to receive and orient an electronic device (e.g., the receptacle 108 and/or the module 120) such that the central axis 124 forms a non-orthogonal angle $\theta_1$ with respect to a plane that extends along an interface between the bracket 110 and the support wall 102. More specifically, the plane represents a vertical plane defined by the axes 190 and 192. However, the electronic device is not required to be precisely aligned with the central axis 124. More specifically, each hub 112 may allow some "floating" of the corresponding electronic device within the hub 112 and still maintain an electrical connection with the electronic device. By way of an example, the non-orthogonal angle $\theta_1$ formed by the central axis 124 and the vertical plane may be 45°, but the electronic device may extend in a direction that, for example, forms an angle between about 40°-50° with respect to the vertical plane.

As compared to known receptacle assemblies that orient the receptacles and/or the modules perpendicular to the support wall, the bracket 110 may reduce a bending radius for cables (not shown) coupled to and extending away from the modules 120. Furthermore, the non-orthogonal angle $\theta_1$ may protect or prevent a user from making direct eye contact with a laser that may emit from the module 120.

In the illustrated embodiment, the non-orthogonal angle $\theta_1$ is shown as rotated about the vertical axis 190 and extending along a plane formed by the axes 192 and 194. However, in alternative embodiments, the non-orthogonal angle $\theta_1$ may be rotated about the horizontal axis 192 and extend along a plane defined by the axes 190 and 194. Furthermore, the non-orthogonal angle $\theta_1$ may extend in a direction that is non-orthogonal with respect to all three axes 190, 192, and 194.

The gasket 116 may have holes 117 and the support wall 102 may have holes 103 that are configured to align with holes 156 (shown in FIG. 3) of the bracket 110 when the bracket 110, the gasket 116, and the support wall 102 are coupled together. For example, threaded fasteners (not shown) may be inserted through the aligned holes to fix the bracket 110, the gasket 116, and the support wall 102 together. However, alternative mechanisms may be used to mount the receptacle assembly 100 to the support wall 102. For example, the gasket 116 may be an elastomeric member (e.g., with a tubular shape) that is pressed between the support wall 102 and the bracket 110.

Figure 2:
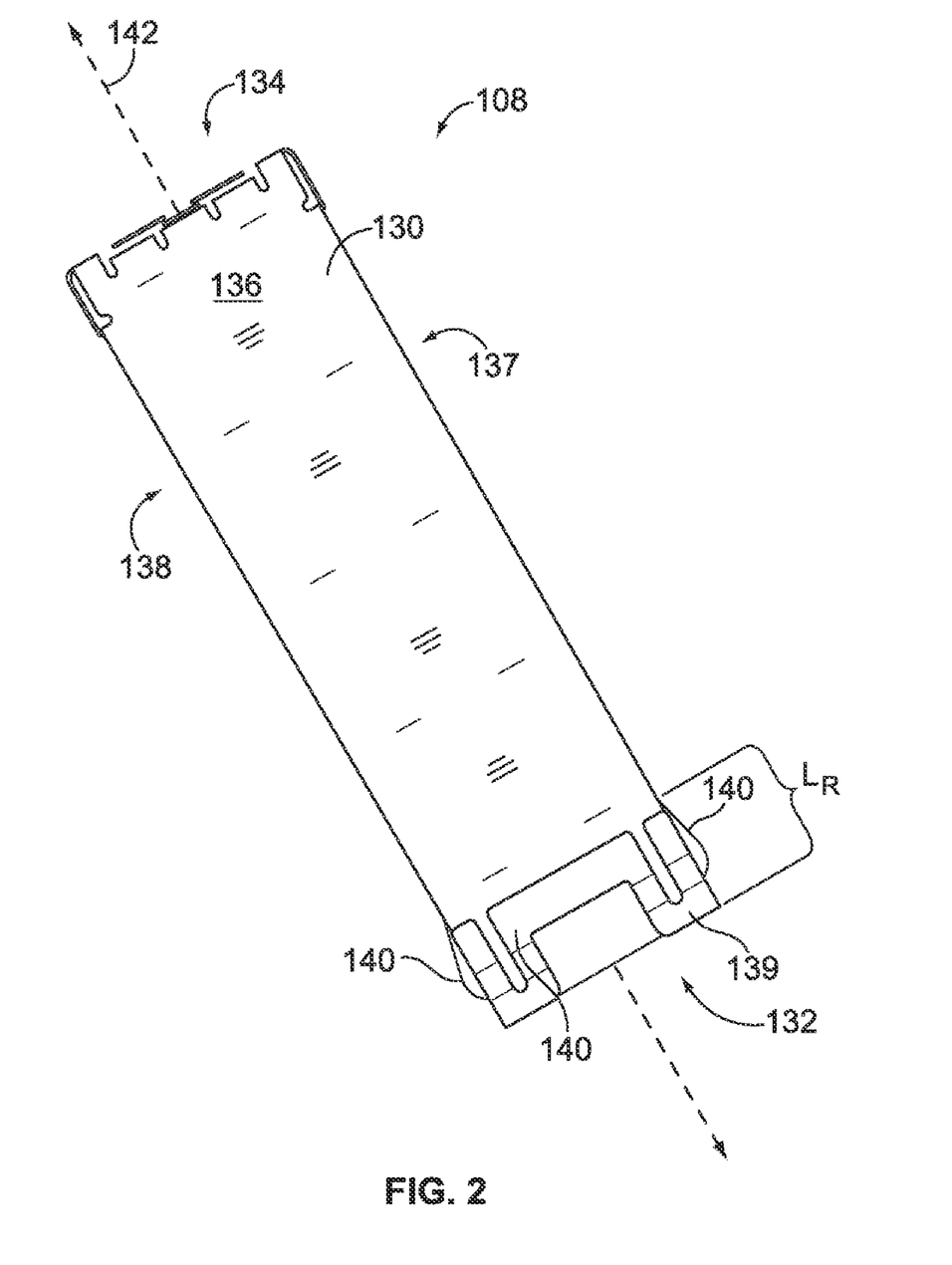
FIG. 2 is a plan view of a receptacle that may be used with the receptacle assembly shown in FIG. 1.

FIG. 2 is a plan view of the receptacle 108 that is configured to receive and electrically engage the module 120 (FIG. 1). The modules 120 may be any removable electronic module, including optoelectronic modules. In the exemplary embodiment, the modules 120 are small form-factor pluggable (SFP) transceivers or another variation (e.g., QSFP, XFP, and the like) that have fiber-optic cables extending therefrom. However, the module 120 may be of another type in other embodiments (e.g., registered jacks) and may have another type of cable (e.g., copper-wiring). The receptacle 108 includes a guideframe 130 having a front end 132, a back end 134, and a plurality of sides 136-138 that extend between the front and back ends 132 and 134 along a longitudinal axis 142. The receptacle 108 includes a cavity (not shown) that is sized and shaped for the module 120 to be inserted therein. The receptacle 108 also includes a connector (not shown) that is configured to communicatively couple the module 120 to the electrical system when the module 120 is inserted into the guideframe 130.

Also shown, the module 120 may include a shield 139 that surrounds the front end 132 of the guideframe 130 and is configured to engage the corresponding hub 112 (FIG. 1) and to facilitate reducing electromagnetic interference (EMI) emitting from the module 120 and/or receptacle 108. For example, the shield 139 may include a plurality of spring fingers 140 coupled to the guideframe 130 proximate to the front end 132. The spring fingers 140 are sized and shaped to make sufficient electrical contact with the corresponding hub 112 to reduce EMI when the module 120 is operatively connected with the receptacle 108. As shown, the spring fingers 140 may flex outwardly from corresponding sides 136-138 and extend a length $L_R$ from the front end 132 along the longitudinal axis 142 toward the back end 134.

FIG. 3 is a perspective view of the bracket 110. Embodiments of the bracket 110 and the receptacle assembly 100 (FIG. 1) may include at least one hub 112 that provides sufficient electrical contact between an electronic device (e.g., the module 120 and/or the receptacle 108 shown in FIG. 1) and the hub 112 to reduce EMI while orienting the electronic device at the non-orthogonal angle $\theta_1$ with respect to a plane. Furthermore, in some embodiments, the hubs 112 may also be configured to allow the receptacle 108 to sufficiently couple to the circuit board 114 (electrically and mechanically) so that the receptacle 108 may obtain a desired performance.

The bracket 110 includes a panel 150 and the plurality of hubs 112A-112D having ports 206 extending therethrough. In the illustrated embodiment, the hubs 112A-112D have similar features and are oriented in a common manner. However, in alternative embodiments, the hubs 112A-112D may have different features and be oriented differently with respect to each other. Also, the bracket 110 may be formed through a die-casting or an injection molding process such that the panel 150 and the hubs 112 are integrally formed. However, in alternative embodiments, the bracket 110 may be constructed from multiple parts. For example, the panel 150 may have a window that is similar to the window 122 of the support wall 102 (FIG. 1). In such alternative embodiments, the hubs 112 may be removably attached to the panel 150 through, for example, snap-fitting.

The panel 150 has a pair of opposing sides 152 and 154 and a thickness $T_1$ extending therebetween. The sides 152 and 154 may extend along the plane formed by axes 190 and 192. The side 154 is configured to face in a direction toward the interior space 104 (FIG. 1) of the electrical system. The side 152 is configured to face in a direction toward the exterior space 106 (FIG. 1) and may have dimensions and a shape that are configured to interface with the support wall 102 and/or the gasket 116 (FIG. 1). For example, the panel 150 may be shaped so that dimensions of the panel 150 are larger than dimensions of the window 122 (FIG. 1). The panel 150 may be substantially rectangular and have a length $L_P$ and a width $W_P$ that are greater than the dimensions of the window 122. Also shown, the panel 150 may include the holes 156 configured to receive threaded fasteners (e.g., screws). In alternative embodiments, the bracket 110 may be mounted to the support wall 102 using other fastening mechanisms (e.g., slidably engaged tabs, latches, interference fits, plugs).

As shown in FIG. 3, the plurality of hubs 112A-112D may be arranged proximate to each other along the length $L_P$ of the bracket 110 or the lateral axis 192. In the illustrated embodiment, the hubs 112A-112D are arranged side-by-side in a series. In other embodiments, the hubs 112A-112D may be separated (i.e., spaced apart) from each other in a series or may be arranged in other configurations. For example, the hubs 112A-112D may be staggered between high and low positions along the length $L_P$. Also, the hubs 112A-112D may be stacked in a vertical direction (i.e., along the axis 190).

Figure 4:
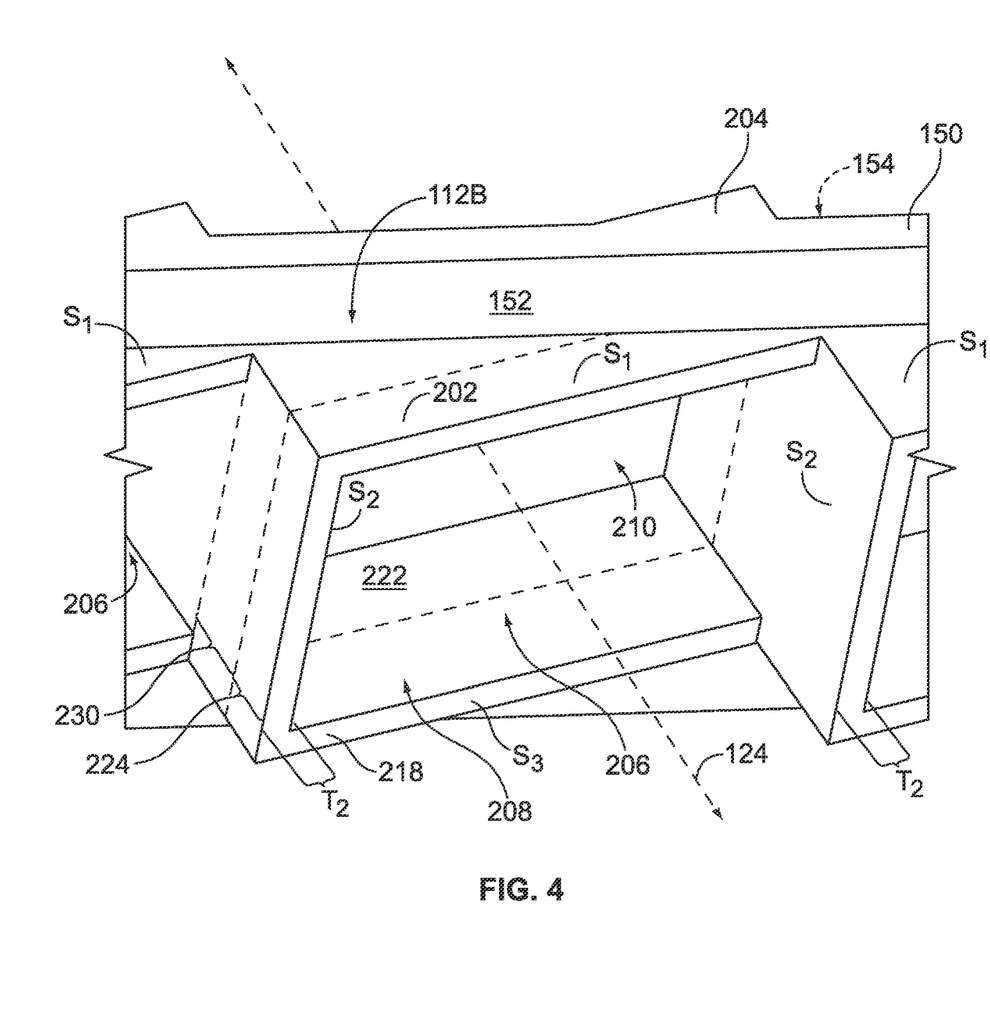
FIG. 4 is an enlarged perspective view of a portion of the bracket in FIG. 3.
Figure 5:
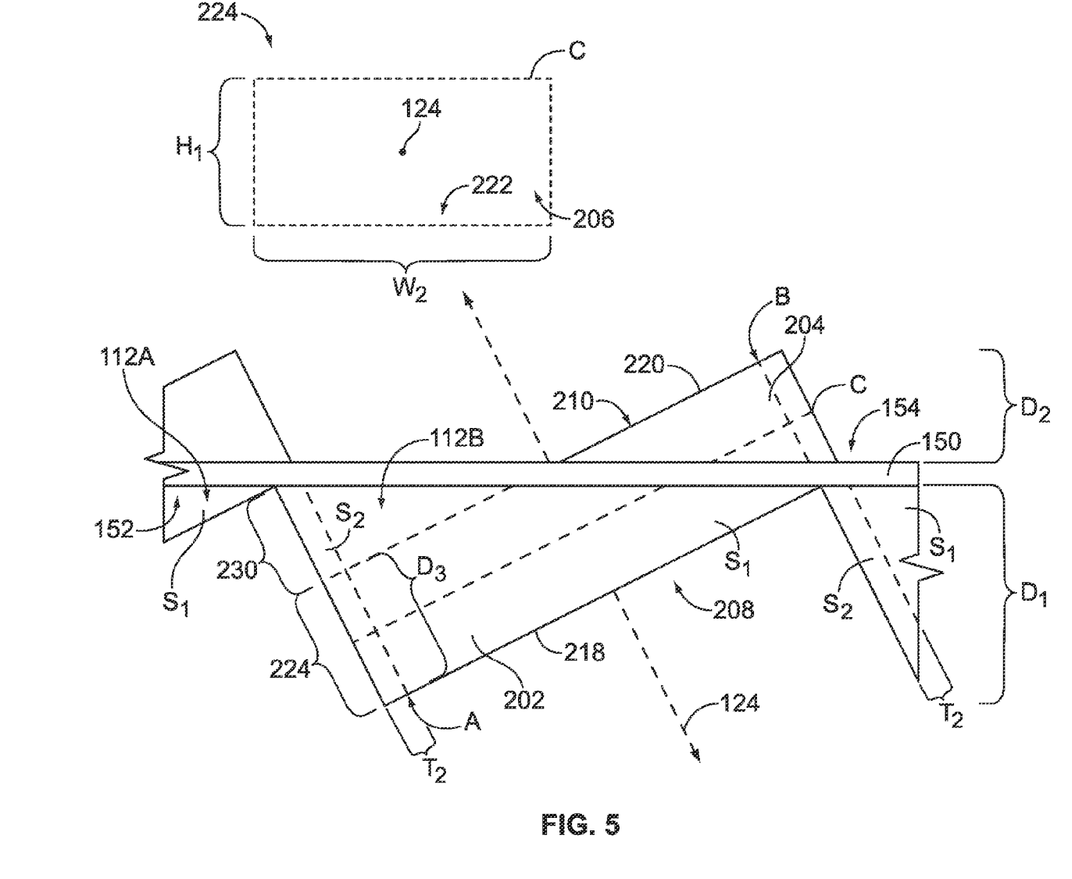
FIG. 5 is a plan view of the portion of the bracket shown in FIG. 4.

FIGS. 4 and 5 are an enlarged perspective view and an enlarged plan view, respectively, of the hub 112B. Although the following description is with respect to the hub 112B, the hubs 112A, 112C, and 112D may have similar features. The hub 112B includes a hub portion 202 that projects from the side 152 and a hub portion 204 that projects from the side 154. The hub portions 202 and 204 define the port 206 of the hub 112B that extends through the panel 150 along the central axis 124 and fluidicly couples the interior and exterior spaces 104 and 106 (FIG. 1) when the bracket 110 is mounted. The hub portion 202 may include an edge 218 that defines an opening 208, and the hub portion 204 may include an edge 220 (FIG. 5) that defines an opening 210. As such, the port 206 may extend directly between the openings 208 and 210 along the central axis 124.

The port 206 may be defined by an inner surface 222 of the hub 112B that is formed by the hub portions 202 and 204. The inner surface 222 may surround the central axis 124 and extend between the openings 208 and 210 along the central axis 124. In the illustrated embodiment, the inner surface 222 may be sized and shaped to hold the receptacle 108 (FIG. 2) in a predetermined orientation. For example, the receptacle 108 may be held so that the longitudinal axis 142 (FIG. 2) is substantially aligned with the central axis 124 when the receptacle 108 is inserted into the port 206. Also, the inner surface 222 may be sized and shaped to frame or surround a perimeter of the front end 132 (FIG. 2) of the receptacle 108 so that the shield 139 (FIG. 2) is electrically engaged with the hub 112B. More particularly, the port 206 is sized and shaped so that the fingers 140 (FIG. 2) make sufficient electrical contact with the surrounding inner surface 222. Accordingly, the hub 112B may facilitate reducing EMI generated by the module 120 (FIG. 1) and/or receptacle 108 when in operation.

Moreover, the dimensions of the hubs 112 may be configured to allow the receptacle 108 to electrically and mechanically couple to the circuit board 114 (FIG. 1) so that the receptacle 108 may obtain a desired performance. In some embodiments, a majority of the inner surface 222 that surrounds the receptacle 108 is formed by the hub portion 202. For example, as shown in FIG. 5, the port 206 may extend a maximum distance $D_1$ away from the side 152. The distance $D_1$ is measured from the side 152 to a point A along a line that is perpendicular to the side 152. Likewise, the hub portion 204 may extend a maximum distance $D_2$ away from the side 154 to a point B. In the illustrated embodiment, the distance $D_1$ is greater than the distance $D_2$. However, in alternative embodiments, the distance $D_2$ may be greater than the distance $D_1$.

Furthermore, the inner surface 222 may define a plurality of port sections that extend along the central axis 124. For example, the inner surface 222 may include an engagement section 224 and a base section 230. The engagement section 224 is a section of the inner surface 222 that completely surrounds the central axis 124. The engagement section 224 may be defined by both the hub portions 202 and 204. However, the base section 230 is a section of the inner surface 222 that surrounds only a portion of the central axis 124. For example, the base section 230 may be formed from only the hub portion 202 and extend between the engagement section 224 and the side 152 along the central axis 124.

The engagement section 224 is configured to engage and hold an electronic device. For example, the engagement section 224 may be configured to engage the front end 132 of the receptacle 108 and, as such, the inner surface 222 of the engagement section 224 may be sized and shaped to extend around or frame a perimeter of the front end 132. For example, the engagement section 224 may extend a depth $D_3$ from the opening 208 (or edge 218) along the central axis 124. The depth $D_3$ may be determined by an amount of surface needed to form sufficient electrical contact with the shield 139. The engagement section 224 of the port 206 may have a uniform cross-section as the engagement section 224 extends the depth $D_3$ along the central axis 124.

For instance, FIG. 5 illustrates a cross-section C of the engagement section 224. The cross-section C extends perpendicular to the central axis 124. The inner surface 222 along the engagement section 224 may be continuously smooth and extend parallel to the central axis 124 throughout the engagement section 224. As such, the engagement section 224 maintains a width $W_2$ and a height $H_1$ throughout that may be determined by the configuration of the electronic device that the engagement section 224 engages.

Also shown in FIGS. 4 and 5, the edge 220 of the hub portion 204 and the edge 218 of the hub portion 202 extend perpendicular to the central axis 124 and parallel to each other. In the illustrated embodiment, the inner surface 222 may be continuously smooth throughout the port 206 (i.e., from edge 218 to edge 220). Accordingly, the port 206 may have a uniform cross-section, such as the cross-section C, that is taken perpendicular to the central axis 124. However, in alternative embodiments, the port 206 may not have a uniform cross-section but may have other shapes configured to receive and orient the electronic device.

The hub portion 202 may have a plurality of sidewalls $S_1$-$S_3$ that project outward from the side 152 and define the edge 218. The sides $S_1$ and $S_3$ may be parallel to each other. Furthermore, the side $S_1$ may be co-planar with respect to the sides $S_1$ from the other hubs 112. Likewise, the side $S_3$ may be co-planar with respect to the sides $S_3$ from the other hubs 112. Furthermore, the sidewalls $S_1$-$S_3$ may have a common thickness $T_2$.

In the illustrated embodiment, the hubs 112 are arranged side-by-side in a series such that the side $S_2$ is shared by an adjacent hub 112. For example, as shown in FIG. 5, the side $S_2$ may facilitate defining the port 206 of the hub 112B and also the port 206 of the hub 112A. Accordingly, adjacent ports 206 may share the sidewall $S_2$ and be separated from each other by the thickness $T_2$. However, in other embodiments, the hubs 112 may be spaced apart from each other such that the hubs 112 do not share sidewalls.

Figure 6:
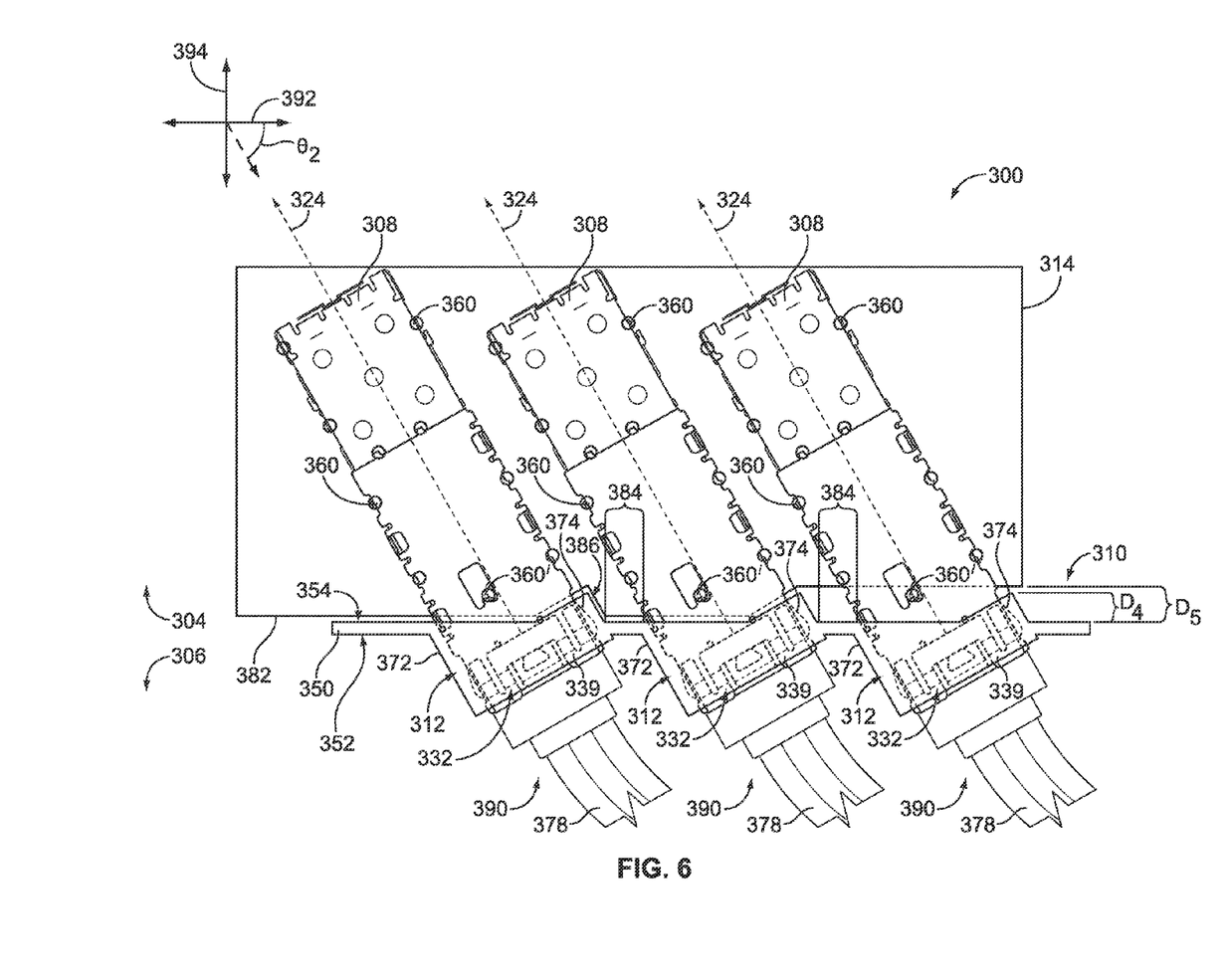
FIG. 6 is a plan view of a receptacle assembly formed in accordance with another embodiment.

FIG. 6 is a plan view of a receptacle assembly 300 formed in accordance with one embodiment that is configured to be mounted to a support wall (not shown). The receptacle assembly 300 includes a plurality of receptacles 308, a bracket 310 having a plurality or hubs 312 that are shaped to receive the receptacles 308, and a circuit board 314 that is configured to be mechanically and electrically coupled to the receptacles 308. The bracket 310 includes a panel 350 that extends along a plane formed by a vertical axis (not shown) and a lateral or horizontal axis 392. The panel 350 has a side 352 that faces an exterior space 306 and a side 354 that faces an interior space 304.

The hubs 312 may be separated from each other by a spacing 384. As described above with respect to the hubs 112, the hubs 312 include a hub portion 372 that projects away from the side 352 into the exterior space 306 and a hub portion 374 that projects away from the side 354 into the interior space 304. The hub portions 372 and 374 define ports (not shown), which are similar to the ports 206. The ports of the hubs 312 may be sized and shaped to orient the receptacles 308 along a corresponding central axis 324 when the receptacles 308 are received therein. The central axes 324 may extend in a common direction (i.e., parallel to each other) and form a non-orthogonal angle $\theta_2$ with respect to the plane that the panel 350 extends along. The receptacles 308 include front ends 332 that have shields 339 thereon. The shields 339 are configured to electrically engage the hubs 312 when the front ends 332 are inserted into the corresponding hubs 312. Accordingly, the hubs 312 are configured to hold the receptacles 308 in a predetermined orientation and to electrically engage the receptacles 308 in order to reduce EMI generated by the receptacle 308 and/or a module 390 inserted into the receptacle 308.

Each receptacle 308 is configured to engage the circuit board 314 at a plurality of coupling points 360. As used herein, a "coupling point" is a location on or proximate to the circuit board 314 where the corresponding receptacle 308 at least one of mechanically couples and electrically couples to the circuit board 314. For example, the coupling point 360 may be located at a hole drilled through the circuit board 314 where a projection or contact of the receptacle 308 is inserted through the hole and forms an interference fit therewith. The hole in the circuit board 314 may be electrically coupled to a contact or trace within the circuit board 314. The coupling points 360 may also be a projection that extends from the circuit board 314 and mates with the receptacle 308.

The circuit board 314 may be shaped to provide a maximum amount of surface area for the receptacle 308 to electrically and/or mechanically couple there to. For example, the circuit board 314 has an edge 382 that extends alongside the panel 350. The edge 382 may have a cut-out 386 that is shaped to receive or surround the hub portion 374. Accordingly, the circuit board 314 may permit locating coupling points 360 closer to the side 354 than other circuit boards that are not conformed to a shape of the bracket 310. For example, the coupling point 360 may be located a point distance $D_4$ away from the side 354 and the circuit board 314 may be shaped so that the cut-out 386 has an edge that is located an edge distance $D_5$ away from the side 354. The point distance $D_4$ may be less than the edge distance $D_5$ and may also be less than the distance $D_2$ (FIG. 5).

The non-orthogonal angle $\theta_2$ is configured to reduce the bending strain of cables 378 as compared to known receptacle assemblies where the central axis 324 extends perpendicular to the plane of the panel 350. The non-orthogonal angle $\theta_2$ may be about 45° to about 70°. The non-orthogonal angle $\theta_2$ may be at least partially based upon or determined by dimensions that are desired or required for the hub 312 or module 390. For example, the non-orthogonal angle $\theta_2$ may be based upon dimensions of the hub portion 372, the hub portion 374, bending strain for the cables 378, and/or the spacing 384 between the receptacles 308.

Although the above description and Figures illustrate the hubs 112 and 312 orienting and engaging a receptacle 108 and 308, respectively, embodiments as described herein may also be use to orient and engage other electronic devices. For example, embodiments may be used to orient and engage the modules 120 and 380.

Thus, the above description is intended to be illustrative, and not restrictive. As such, the above-described embodiments (and/or aspects thereof) may be used in combination with each other. In addition, many modifications may be made to adapt a particular situation or material to the teachings of the invention without departing from its scope. Dimensions, types of materials, orientations or the various components, and the number and positions of the various components described herein are intended to define parameters of certain embodiments, and are by no means limiting and are merely exemplary embodiments.

Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A bracket configured to be mounted to a support wall in an electrical system, the bracket comprising:
    a panel having opposite exterior and interior sides that extend along a plane and separate exterior and interior spaces of the electrical system, the exterior side facing the exterior space and the interior side facing the interior space;
    first and second hubs configured to receive respective electronic devices, each of the first and second hubs including:
        an exterior hub portion extending from the exterior side into the exterior space; and
        an interior hub portion extending from the interior side into the interior space, the exterior and interior hub portions defining a port through the panel to connect the interior and exterior spaces, the port extending along a central axis and being sized and shaped to receive the respective electronic device along the central axis, the central axis forming a non-orthogonal angle with respect to the plane of the exterior and interior sides, wherein the panel and first and second hubs are integrally formed; and
    a shared sidewall that separates the ports of the first and second hubs, the shared sidewall having opposite sidewall surfaces that extend substantially parallel to one another, each of the sidewall surfaces partially defining a corresponding one of the ports of the first and second hubs.

2. The bracket in accordance with claim 1 wherein the central axes of the ports of the first and second hubs are oriented parallel to each other.

3. The bracket in accordance with claim 1 wherein each of the ports includes an engagement section that is sized and shaped to extend around a perimeter of the corresponding electronic device, the engagement section having a uniform cross-section that is perpendicular to the central axis.

4. The bracket in accordance with claim 1 wherein each of the first and second hubs includes an inner surface that defines the corresponding port, the inner surface extending along the central axis and being continuously smooth as the inner surface extends therealong.

5. The bracket in accordance with claim 4 wherein each of the ports has a uniform cross-section therethrough that is perpendicular to the corresponding central axis.

6. The bracket in accordance with claim 1 wherein each of the ports extends a first distance away from the exterior side that is measured along a line that is perpendicular to the exterior side, and each of the ports extends a second distance away from the interior side that is measured along a line that is perpendicular to the interior side, the first distance being greater than the second distance.

7. The bracket in accordance with claim 1 wherein the non-orthogonal angle between the plane that extends along the exterior and interior sides and the central axis is about 45° to about 70°.

8. The bracket in accordance with claim 1 wherein the shared sidewall has a substantially uniform thickness measured between the opposite sidewall surfaces.

9. A receptacle assembly configured to be mounted to a support wall in an electrical system, the receptacle assembly comprising:
    a receptacle having a guideframe configured to receive an electronic module, the guideframe having front and back ends and a longitudinal axis extending therebetween, the receptacle including an electromagnetic interference (EMI) shield that surrounds the guideframe proximate to the front end; and
    a bracket configured to be mounted to the support wall, the bracket comprising:
        a panel having opposite first and second sides that extend along a plane and separate exterior and interior spaces of the electrical system, the first side facing the exterior space and the second side facing the interior space; and
        a hub configured to receive the receptacle, the hub including a first hub portion extending from the first side into the exterior space and a second hub portion extending from the second side into the interior space, the hub including an inner surface that defines a port through the panel to connect the interior and exterior spaces, the port extending along a central axis and being sized and shaped to receive the receptacle along the central axis, the central axis forming a non-orthogonal angle with respect to the plane of the first and second sides;
    wherein the inner surface of the hub is sized and shaped to surround the front end of the guideframe so that the EMI shield is located between the inner surface and the guideframe and is electrically engaged with the inner surface.

10. The receptacle assembly in accordance with claim 9 further comprising a gasket configured to be compressed between the support wall and the panel.

11. The receptacle assembly in accordance with claim 9 wherein the hub comprises a plurality of hubs, each hub having a port extending along a central axis, the central axes of the plurality of hubs being oriented parallel to each other.

12. The receptacle assembly in accordance with claim 9 wherein the inner surface extends along the central axis and is continuously smooth as the inner surface extends therealong.

13. The receptacle assembly in accordance with claim 9 wherein the hub comprises a plurality of hubs, the hubs being spaced apart from each other a distance.

14. The receptacle assembly in accordance with claim 9 wherein the EMI shield comprises a plurality of spring fingers that are positioned around the guideframe, the spring fingers flexing outwardly from the guideframe to electrically engage the inner surface of the hub.

15. The receptacle assembly in accordance with claim 9 wherein the inner surface of the hub defines an engagement section that completely surrounds the central axis, the engagement section electrically engaging the EMI shield, a majority of the EMI shield projecting beyond the first side toward the exterior space.

16. The receptacle assembly in accordance with claim 9 wherein the receptacle is configured to engage a circuit board at a plurality of coupling points, the receptacle including projections or contacts that at least one of mechanically and electrically couple to the circuit board at the coupling points.

17. A receptacle assembly configured to be mounted to a support wall in an electrical system, the receptacle assembly comprising:
    a receptacle having a guideframe configured to receive an electronic module;
    a circuit board configured to be mechanically and electrically coupled to the receptacle; and
    a bracket configured to be mounted to the support wall, the bracket comprising:
        a panel having opposite first and second sides that extend along a plane and separate exterior and interior spaces of the electrical system, the first side facing the exterior space and the second side facing the interior space; and
        a hub configured to receive the receptacle, the hub including a first hub portion extending from the first side into the exterior space and a second hub portion extending from the second side into the interior space, the first and second hub portions defining a port through the panel to connect the interior and exterior spaces, the port extending along a central axis and being sized and shaped to receive the receptacle along the central axis, the central axis forming a non-orthogonal angle with respect to the plane of the first and second sides.

18. The receptacle assembly in accordance with claim 17 wherein the circuit board comprises an edge having a cut-out shaped to surround the second hub portion projecting from the panel.

19. The receptacle assembly in accordance with claim 18 wherein the cut-out extends an edge distance away from the second side of the panel, the receptacle and the circuit board engaging each other at a coupling point located at a point distance away from the second side, the point distance being less than the edge distance.

20. A bracket configured to be mounted to a support wall in an electrical system, the bracket comprising:
    a panel having opposite exterior and interior sides that extend along a plane and separate exterior and interior spaces of the electrical system, the exterior side facing the exterior space and the interior side facing the interior space;
    first and second hubs configured to receive respective electronic devices, each of the first and second hubs including:

an exterior hub portion extending from the exterior side into the exterior space; and an interior hub portion extending from the interior side into the interior space, the exterior and interior hub portions defining a port through the panel to connect the interior and exterior spaces, the port extending along a central axis and being sized and shaped to receive the electronic device along the central axis, the central axis forming a non-orthogonal angle with respect to the plane of the exterior and interior sides; and a circuit board configured to extend along the panel, the circuit board comprising an edge having a cut-out that is shaped to surround the interior hub portions projecting from the panel.

* * * * *